C. M. TANNER.
CROSS-CUT SAW-HANDLE.

No. 170,970. Patented Dec. 14, 1875.

Witnesses:
Inventor:
Charles M. Tanner

UNITED STATES PATENT OFFICE.

CHARLES M. TANNER, OF DEFIANCE, OHIO.

IMPROVEMENT IN CROSSCUT-SAW HANDLES.

Specification forming part of Letters Patent No. 170,970, dated December 14, 1875; application filed November 1, 1875.

*To all whom it may concern:*

Be it known that I, CHARLES M. TANNER, of Defiance, in the county of Defiance and State of Ohio, have invented certain Improvements in Crosscut-Saw-Handles, of which the following is a specification:

This invention relates to certain improvements in means of attaching handles to saws, being additional improvements on a patent granted to me the 11th day of October, 1875, No. 168,590.

These improvements consist in dispensing with the loose collar in said former patent, and casting a lug or ear on each of the plates, which engage with the serrated edge of the sleeve; also, instead of riveting the plates to the saw, I employ set-screws; and, further, instead of dividing the shank its full length, I divide it part way only, thus enabling the screw to be cut on one solid piece. In all other respects there is no difference.

Figure 2:
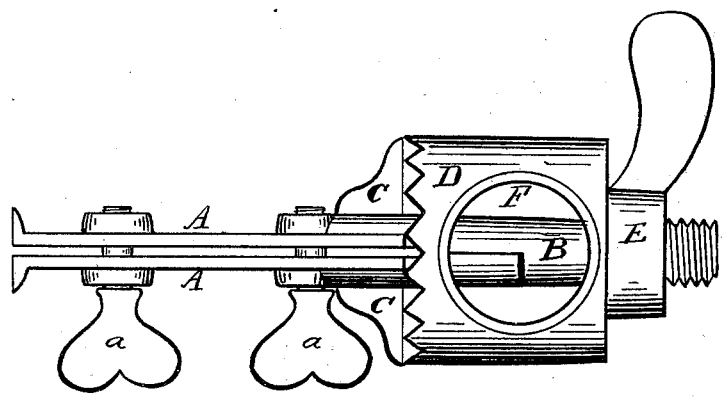
Figure 1:
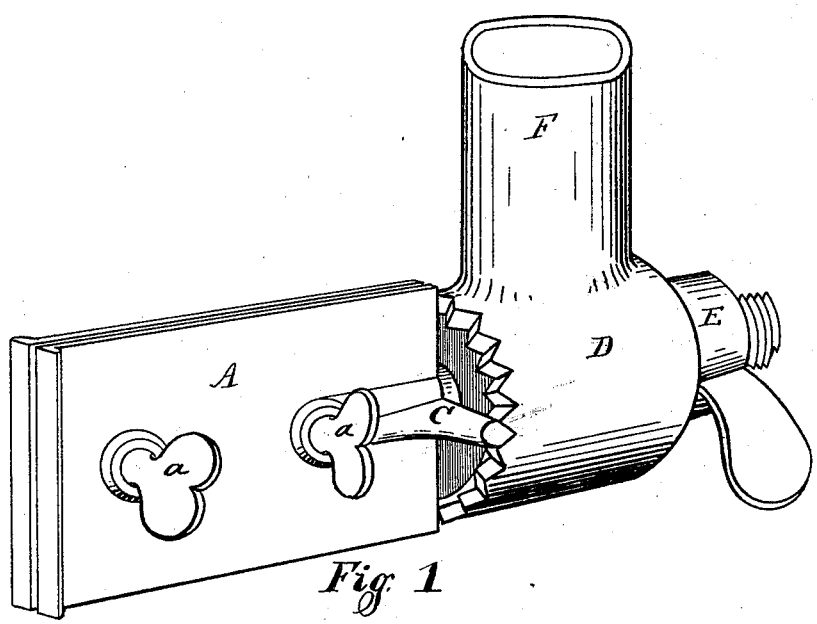

In the accompanying drawing, Figure 1 is a perspective view, and Fig. 2 is a top or plan view.

A A are two plates, which are to be secured to the end of a saw-plate by means of two thumb-screws, *a a*. One of said plates has a full-length shank, B, but is partly cut away at the portion nearest the plate to receive the half portion of the shank on the other plate. The full-length portion of the shank B has the screw cut on the end of it. C C are ears cast on the side of the plates adjoining the shank, and engage with the serrated edge of the sleeve D, said sleeve having a head in each end, through which the shank B passes, and is secured thereto by the nut E. F is a socket for a wooden handle, like to that in my former patent.

The mode of turning the handle is precisely like that in my former patent, which is by simply loosening the nut E.

The advantages of these improvements are, that the plates may be easily removed from the saw when desired, and by dispensing with the loose collar the handle is more easily adjusted; and, further, in making the shank as described a smoother, better screw can be cut.

Having described my improvements, I claim—

The plates A A, one having a full-length shank, B, partly cut away to receive the portion on the other plate, and each plate having the ears C C, the sleeve D, having the socket F, and the nut E, all constructed as and for the purpose set forth.

CHARLES M. TANNER.

Witnesses:
S. T. SUTPHEN,
JOHN D. LAMB.